US012398030B2

(12) United States Patent
Rodriguez et al.

(10) Patent No.: US 12,398,030 B2
(45) Date of Patent: Aug. 26, 2025

(54) MIXER ASSEMBLY REMOVABILITY ARRANGEMENTS FOR HAND-HELD BEVERAGE DISPENSERS

(71) Applicant: LANCER CORPORATION, San Antonio, TX (US)

(72) Inventors: Ricardo Abugarade Rodriguez, Schertz, TX (US); Merrill R. Good, San Antonio, TX (US)

(73) Assignee: Lancer Corporation, San Antonio, TX (US)

(*) Notice: Subject to any disclaimer, the term of this patent is extended or adjusted under 35 U.S.C. 154(b) by 121 days.

(21) Appl. No.: 18/209,690

(22) Filed: Jun. 14, 2023

(65) Prior Publication Data

US 2023/0399221 A1 Dec. 14, 2023

Related U.S. Application Data

(63) Continuation-in-part of application No. 18/126,410, filed on Mar. 25, 2023, now Pat. No. 12,157,659, which is a continuation of application No. 17/737,469, filed on May 5, 2022, now Pat. No. 11,643,318, which is a continuation of application No. 17/339,917, filed on Jun. 4, 2021, now Pat. No. 11,345,584.

(60) Provisional application No. 63/353,579, filed on Jun. 18, 2022, provisional application No. 63/129,380, filed on Dec. 22, 2020, provisional application No. 63/034,762, filed on Jun. 4, 2020.

(51) Int. Cl.
*B67D 1/00* (2006.01)
*B67D 1/14* (2006.01)

(52) U.S. Cl.
CPC ......... *B67D 1/0084* (2013.01); *B67D 1/1438* (2013.01); *B67D 2001/0094* (2013.01)

(58) Field of Classification Search
CPC ................ B67D 1/0084; B67D 1/1438; B67D 2001/0094; B67D 1/0051
See application file for complete search history.

(56) References Cited

U.S. PATENT DOCUMENTS 4,276,999 A * 7/1981 Reichenberger ..... B67D 1/0084 222/17
4,921,140 A * 5/1990 Belcham .............. B67D 1/0084 200/332.2
2004/0217131 A1* 11/2004 McCann .............. B67D 1/0086 222/144.5
2008/0223876 A1* 9/2008 Schroeder ............ B67D 1/0084 222/144.5
2008/0232090 A1* 9/2008 Hecht .................. B67D 1/1477 362/96

(Continued)

*Primary Examiner* — Donnell A Long
(74) *Attorney, Agent, or Firm* — Christopher L. Makay

(57) ABSTRACT

An arrangement for selective removal of a mixer assembly from a hand-held beverage dispenser includes a handle body housing a piping system for dispensing post-mix beverages and a toe plate for dependently supporting the mixer assembly. Upwardly projecting mounting bosses have central orifices running end-to-end therethrough, and extending at the bottom end through the toe plate. Each orifice is axially aligned with a mounting hole of a mixer assembly as operably supported by the tow plate, and releasable fasteners provided top-to-bottom through the orifices engage the mounting holes to affix the mixer assembly to the toe plate.

3 Claims, 10 Drawing Sheets

(56) References Cited

U.S. PATENT DOCUMENTS

| | | | | |
|---|---|---|---|---|
| 2009/0084817 | A1* | 4/2009 | Schroeder ............ | B67D 1/0084<br>222/144.5 |
| 2009/0114680 | A1* | 5/2009 | Williams ............. | B67D 1/0021<br>222/144.5 |
| 2019/0330044 | A1* | 10/2019 | Conover .............. | B67D 1/0052 |

* cited by examiner

MIXER ASSEMBLY REMOVABILITY ARRANGEMENTS FOR HAND-HELD BEVERAGE DISPENSERS

BACKGROUND OF THE INVENTION

1. Field of the Invention

The present invention relates to post-mix drink dispensing, and, more particularly, but not by way of limitation, to arrangements for hand-held beverage dispensers enabling ready removal or attachment of post-mix type drink dispenser assemblies from or to hand-held beverage dispensers.

2. Description of the Related Art

Post-mix type hand-held beverage dispensers, such as are often referred to as bar guns or soda guns are well known conveniences in the food and bar service industries, enabling beverages to be prepared as they are dispensed by mixing together a beverage product, such as, for example, a syrup or like concentrate, and a diluent, such as, for example, plain water or carbonated water. Although prior art dispensers of the bar gun class include such conveniences as readily removable nozzle housings, as are generally cooperatively adapted with a mixer assembly in implementation of a post-mix type drink dispenser assembly, conventional dispensers of this class generally lack features for maintainability of the remainder of the provided hand-held beverage dispenser. For example, the mixer assembly, as distinguished from the cooperatively adapted nozzle housing, are generally difficult to adequately maintain and not readily removable for repair or replacement, let alone for routine cleaning. The implemented mixer assemblies are generally either unitary with the handle body or so highly integral therewith as to make removal or disassembly for maintenance impractical if not wholly impossible.

Accordingly, a hand-held post-mix type drink dispenser including a readily removable mixer assembly will facilitate repair or replacement of the mixer assembly, and will promote good health by enabling thorough cleaning on a routine basis, and will enable flexibility in the development of a commercial offering by allowing use of any number of differently designed dispenser assemblies with a single design of handle body and piping system.

SUMMARY OF THE INVENTION

An arrangement for selective removal of a post-mix type mixer assembly from a hand-held beverage dispenser includes a handle body housing a piping system for dispensing post-mix beverages through a mixer assembly; a toe plate for dependently supporting the mixer assembly; and a plurality of upwardly projecting mounting bosses formed on a top side of the toe plate, each mounting boss having a central orifice running end-to-end therethrough and extending from the bottom end of the mounting boss through the toe plate. Each orifice is adapted to be axially aligned with a mounting hole of a mixer assembly as operably supported by the tow plate. Releasable fasteners provided top-to-bottom through the orifices engage the mounting holes of the mixer assembly to affix the mixer assembly to the toe plate.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 1:
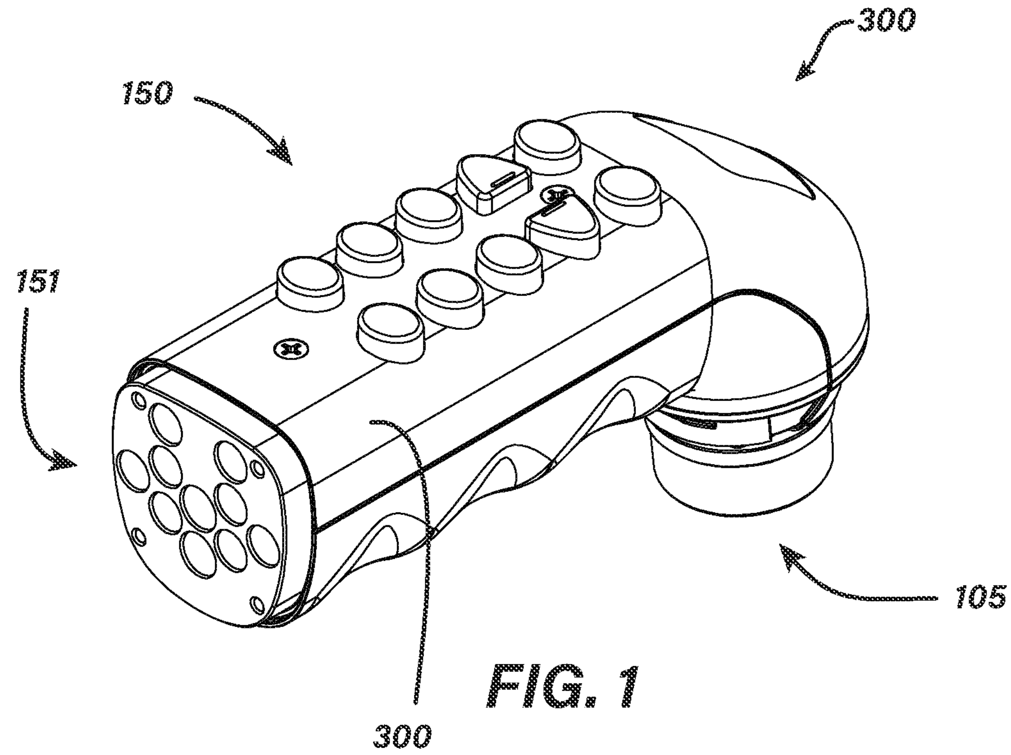
FIG. 1 is a top isometric view illustrating a mixer assembly removability arrangement according to the first embodiment.
Figure 2:
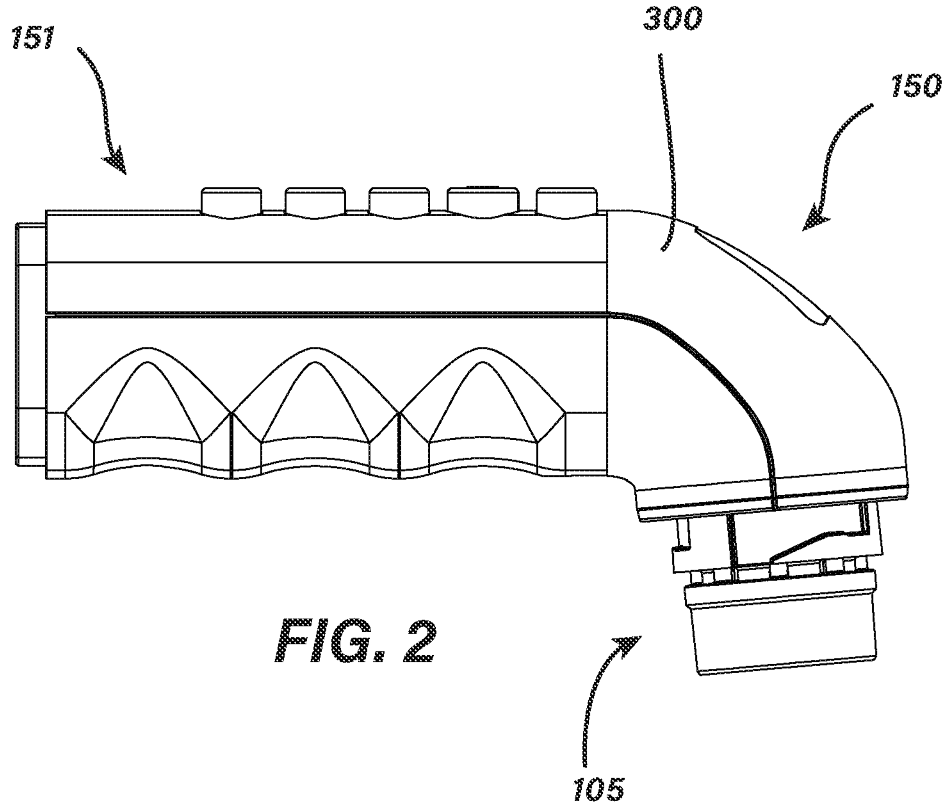
FIG. 2 is a side elevational view of the mixer assembly removability arrangement according to the first embodiment.
Figure 3:
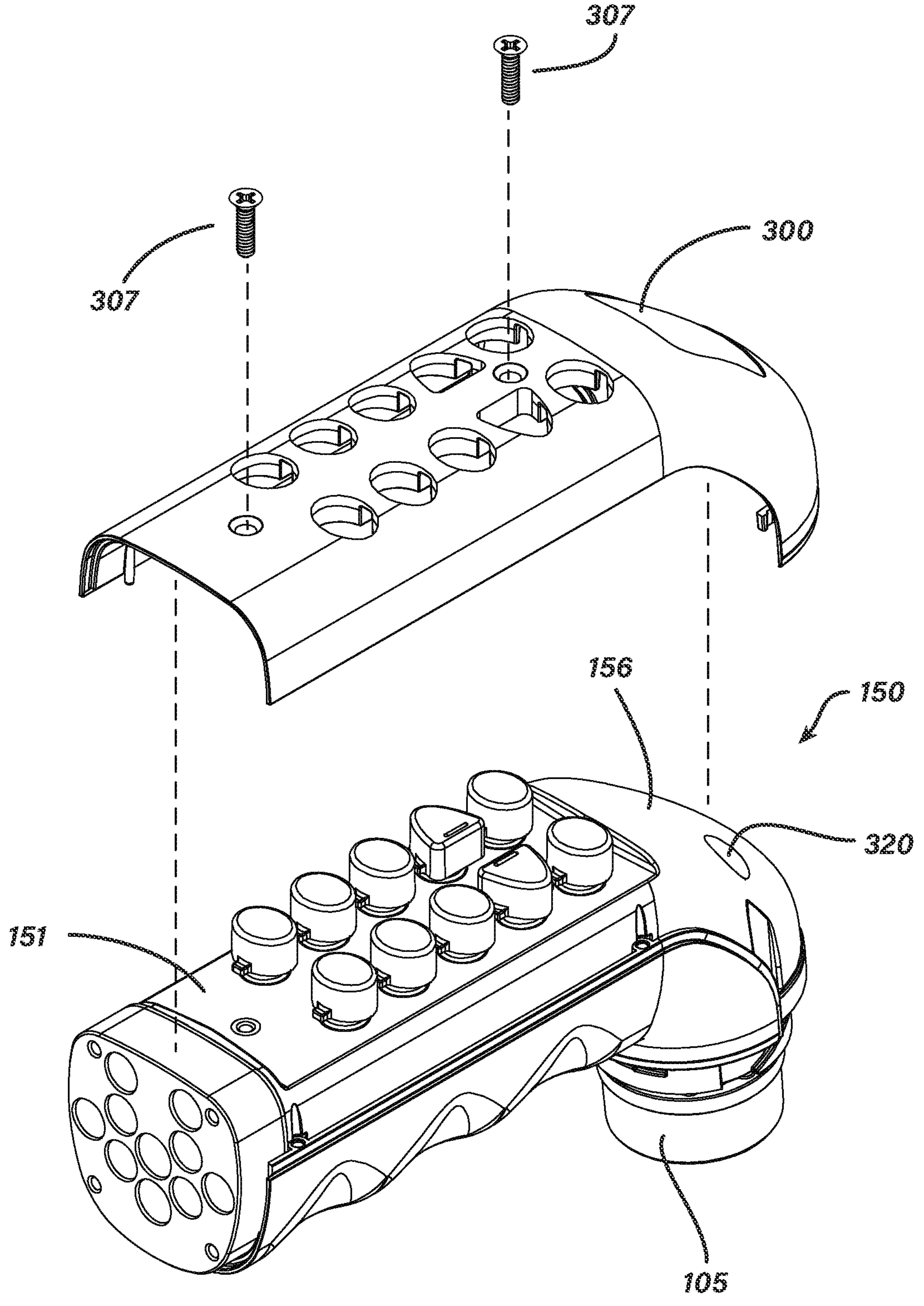
FIG. 3 is a partially exploded top isometric view illustrating the mixer assembly removability arrangement according to the first embodiment.

As shown in FIGS. 1-5, a first embodiment of a mixer assembly removability arrangement is particularly suited to implementation in connection with a hand-held beverage dispenser 150 having a full length upper enclosure member 300 about the implemented handle body 151. As shown in FIGS. 1-2, such a suitable hand-held beverage dispenser 150 is shown with a mixer assembly 105 secured operably in place. In order to access the mixer assembly removability arrangement of the first embodiment, the full length upper enclosure member 300 about the implemented must first be removed to expose the forward end 156 of the handle body 151. As shown in FIG. 3, the full length upper enclosure member 300 about the handle body 151 of the exemplary hand-held beverage dispenser 150 is readily removed upon conventional extraction of the two upper enclosure mounting screws 307. With the upper enclosure member 300 lifted off the handle body 151, access ports 320 provided in accordance with the first embodiment are exposed at the forward end 156 of the handle body 151.

Figure 4:
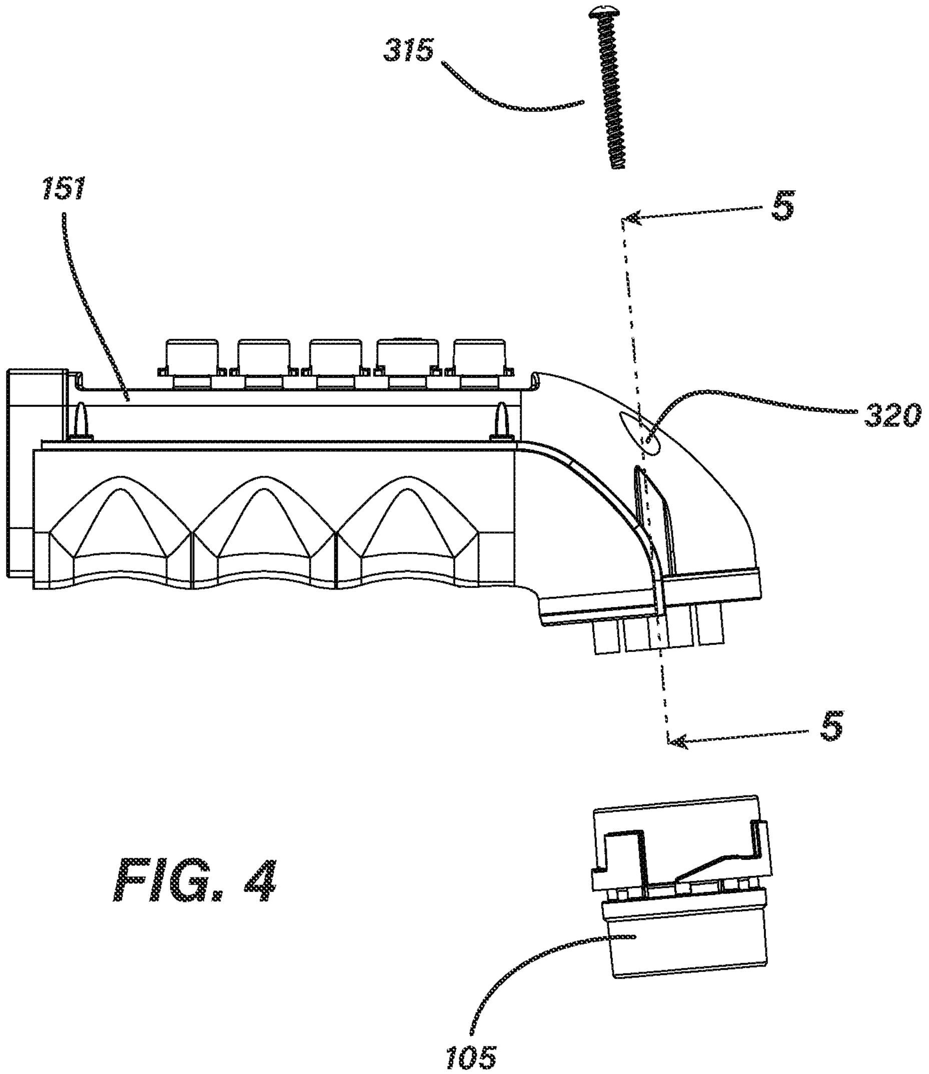
FIG. 4 is a partially exploded side elevational view illustrating the mixer assembly removability arrangement according to the first embodiment.
Figure 5:
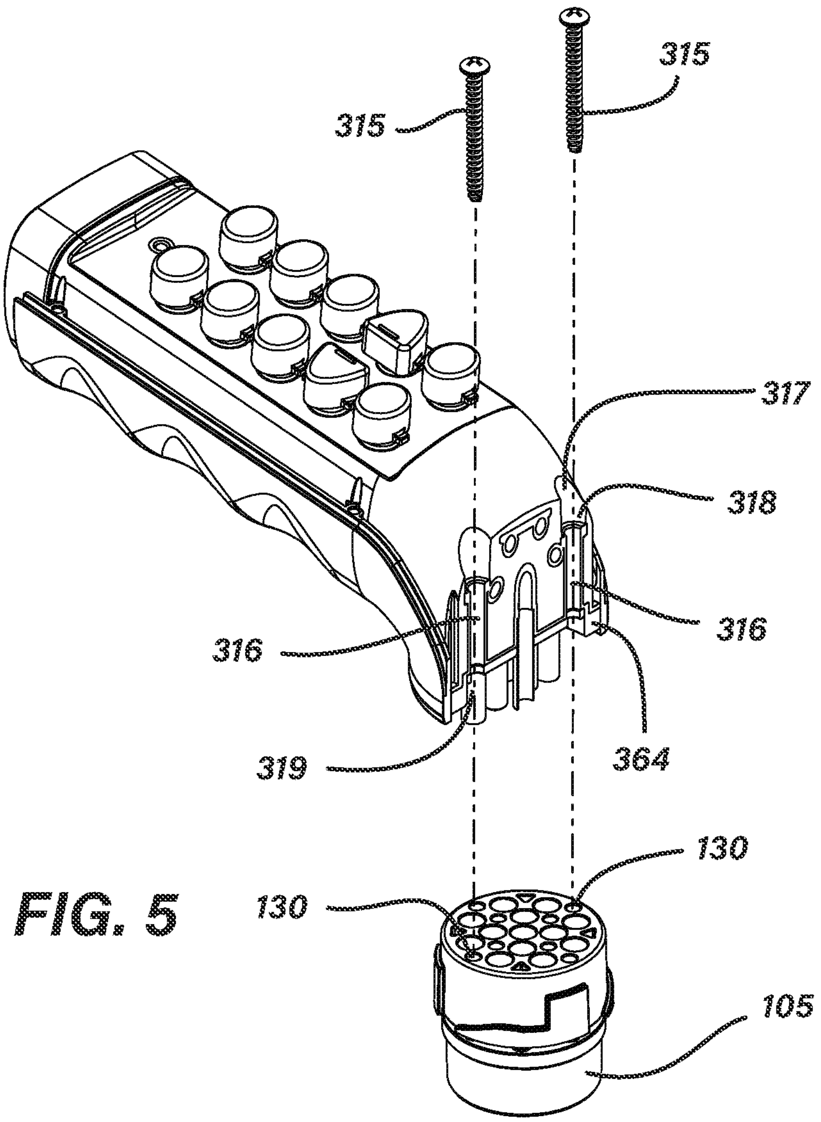
FIG. 5 is a partial cross-sectional isometric view taken along lines 5-5 of FIG. 4.

As shown in the partially exploded view of FIG. 4, provided mixer mounting hardware such as, for example, machine screws 315 are readily conventionally extracted through the exposed access ports 320, thereby readily releasing the mixer assembly 105 from the handle body 151. As shown in the partial cross sectional view of FIG. 5, mixer assembly removability arrangement of the first embodiment includes the provision of preferably two upwardly projecting mounting bosses 316, each of which has a central through hole 319 extending beyond the mounting boss 316 and through the toe plate 364. In a critical aspect of the present invention, each of the through holes 319 is axially aligned with attached position of a respective threaded hole 130 at the top 107 of the mixer assembly 105. Additionally, however, collar 318 is most preferably provided about the top end 317 of each upwardly projecting mounting boss 316. The each provided collar 318 forms a rigid stop for the head of a machine screw 315 or like structure of alternatively implemented mixer mounting hardware, which in turn establishes a precisely known, fixed insertion depth for the machine screws 315 or other mounting hardware 315, and thereby preventing damage to the mixer assembly 105.

Where a full length upper enclosure for a hand-held beverage dispenser is not possible or otherwise undesired, thereby precluding implementation of the first embodiment, a second embodiment of the mixer assembly removability arrangement contemplates access to interior space at the top, forward end of the handle body of a the hand-held beverage dispenser through an inventive cover. Turning now then to FIGS. 6-13, a structural arrangement for simple removal or attachment of a post-mix type drink dispenser assembly from or to a hand-held beverage dispenser—a mixer assembly removability arrangement—is shown and described. For convenience and clarity the exemplary implementation of the mixer assembly removability arrangement, as now set forth, shows the mixer assembly removability arrangement as integrated with, and describes the arrangement with reference to, a hand-held beverage dispenser 150 that is specially adapted to implement the inventive mixer assembly removability arrangement, but is otherwise an exemplary only generic representative of the bar gun class of dispensers. That said, the inventive aspects of the mixer assembly removability arrangement are in no manner necessarily limited to application in connection with the now described hand-held beverage dispenser 150, the exemplary post-mix type drink dispenser assembly, or any other particular implementation of a hand-held beverage dispenser or post-mix type drink dispenser assembly.

On the other hand, the available space within, as determined by, the extents of the handle body 151 is necessarily very limited by such matters of commercial suitability as include the need to produce the handle body 151 of the hand-held beverage dispenser 150 with an ergonomically acceptable shape within the maximum dimensions acceptable to meet at least minimum requirements for ease of use and comfort in hand of the hand-held beverage dispenser 150. As also previously discussed, the extents of the handle body 151 of a commercially suitable hand-held beverage dispenser 150 are further limited by the need to produce a hand-held beverage dispenser 150 having a total mass at or below the maximum total mass deemed acceptable for ease of use and comfort in hand of the hand-held beverage dispenser 150. With this ever persistent matter of available space afforded by the extents of an otherwise optimized handle body 151 clearly in mind, however, it will be appreciated that Applicant has, within all of the foregoing constraints, devised a mixer assembly removability arrangement, as now described, that not only achieves very simple removal and attachment of a post-mix type drink dispenser from or to a hand-held beverage dispenser, but also advances the basic capabilities expected of hand-held beverage dispensers.

As will be better understood further herein, Applicant's most preferred implementation of the mixer assembly removability arrangement goes beyond enabling simple removal or attachment of a single specially adapted post-mix type drink dispenser assembly from or to a hand-held beverage dispenser to use this inventively provided capability to further provide for use of any user-selected one of a plurality of post-mix type drink dispenser assemblies in connection with a single implementation of a hand-held beverage dispenser. The plurality of post-mix type drink dispenser assemblies from which the user selection is made may include post-mix type drink dispenser assemblies of differing operating characteristics, such as may be desirable for primarily dispensing one type of beverage product as opposed to another. Additionally and as will also be better understood further herein, the plurality of post-mix type drink dispenser assemblies from which the user selection is made may also include commercially available off-the-shelf post-mix type drink dispenser assemblies, including assemblies originally developed for use with countertop or standalone post-mix drink dispensers. What is more, compatibility features incorporated within the implemented mixer assembly removability arrangement, as now shown and described or that may be later developed, may enable use of such commercially available off-the-shelf post-mix type drink dispenser assemblies with little or no modification or other adaptation, while nonetheless meeting the previously described design constraints.

Figure 6:
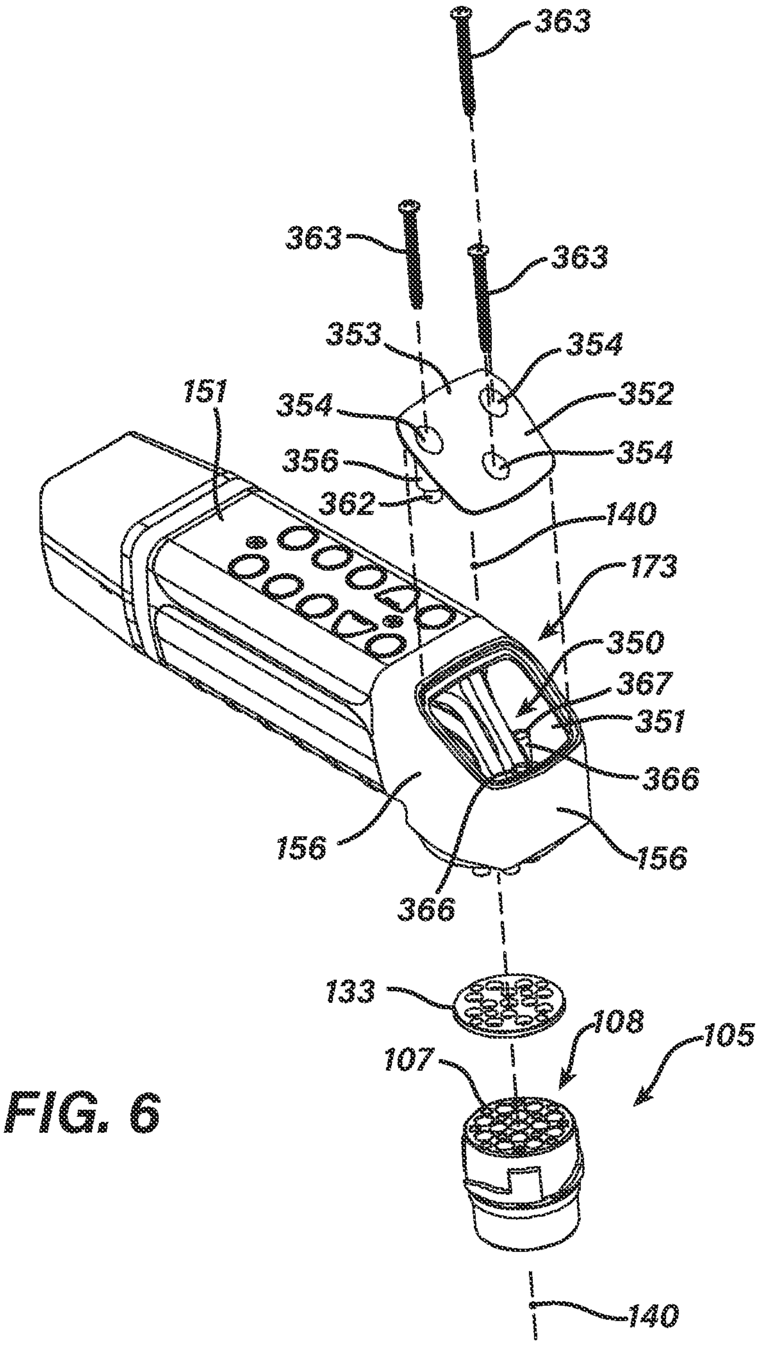
FIG. 6 is a partially exploded top isometric view illustrating a mixer assembly removability arrangement according to the second embodiment.
Figure 7:
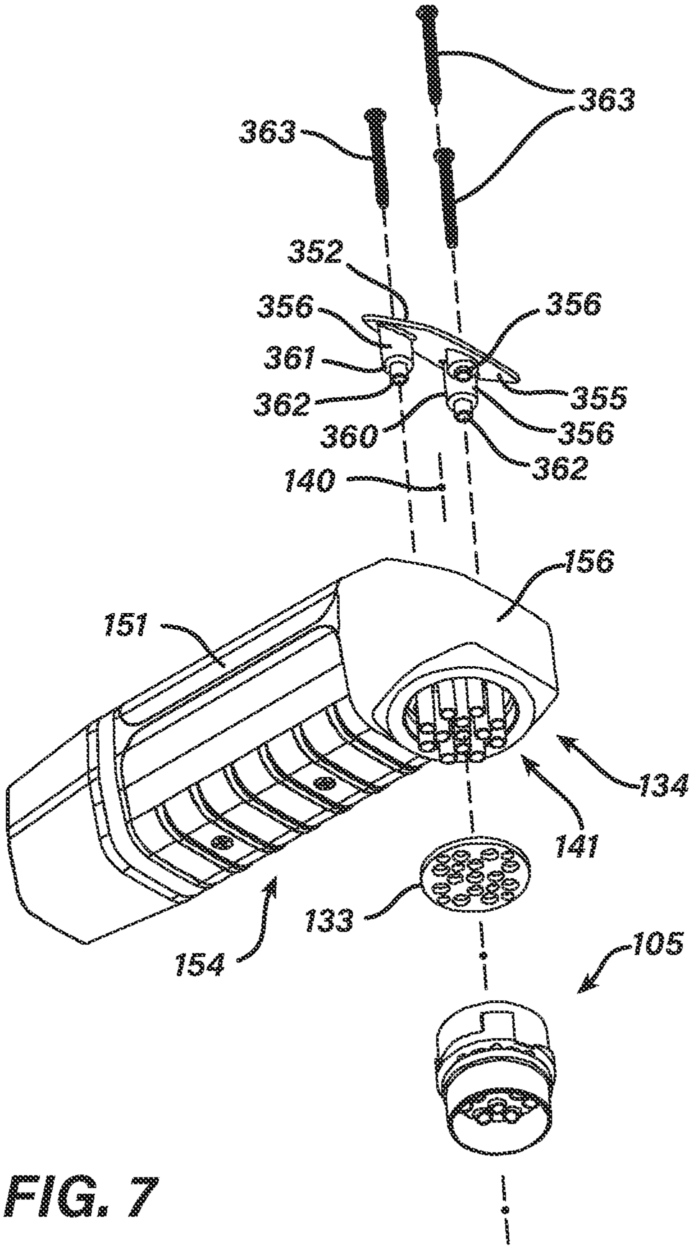
FIG. 7 is a partially exploded bottom isometric view illustrating the mixer assembly removability arrangement according to the second embodiment.

Referring now to FIGS. 6-7, in particular, each of which depicts various components of the hand-held beverage dispenser 150 as exploded along the longitudinal axis 140 through the mixer assembly 105, an exemplary mixer assembly 105 for use with the hand-held beverage dispenser 150 is shown as positioned for operable dependent attachment to the bottom 154 of the handle body 151 of the hand-held beverage dispenser 150 at a location adjacent the forward end 156 of the handle body 151. Additionally, the figures show a specially formed cover 352 for an opening 351 to an interior space 350 formed or otherwise provided near the top 152 and at the forward end 156 of the handle body 151 of the hand-held beverage dispenser 150. The specially formed cover 352 is shown as positioned for placement in use to cover the opening 351 to the interior space 350. As also shown in FIG. 6, but more clearly in FIG. 13, the opening 351 provides access to a plurality of upwardly projecting mounting bosses 366, which are also specially formed within the interior space 350. As will be better understood further herein, the cover 352 for the opening 351 to the interior space 350, positioned as described with respect to the opening 351, is also simultaneously positioned for cooperative engagement with the upwardly projecting mounting bosses 366 in implementation of the inventive mixer assembly removability arrangement of the present invention.

FIGS. 6-7 also show various other components of the hand-held beverage dispenser 150, as support implementation of the mixer assembly removability arrangement, or form part thereof. For example, a plurality of connector tubes 134 is shown as operably deployed within the various previously described fluid outlets 174 from the piping system of the hand-held beverage dispenser 150. As will be additionally described further herein, the connector tubes 134 facilitate the previously mentioned attachment of the mixer assembly 105 to the handle body 151. A rubber or like material seal 133 is shown as positioned for use in operative attachment of the mixer assembly 105 to the handle body 151, as also will be better understood further herein. Finally, the figures show a plurality of machine screws 363 as positioned for use in operably affixing the specially formed cover 352 in place about the opening 351 to the previously discussed interior space 350. Implementing multi-functionality similar to that as previously noted for the cover 352 and as will be better understood further herein, the machine screws 363, or other suitably provided fasteners, positioned as described with respect to the cover 352, are also simultaneously positioned for cooperative engagement with the previously discussed specially formed cover 352, upwardly projecting mounting bosses 366, elements of the mixer assembly 105 and additional elements of the handle body 151, as will be described further herein, in implementation of the inventive mixer assembly removability arrangement of the present invention.

In order to doubly ensure clarity in the following further description of the inventive mixer assembly removability arrangement of the present invention, it is noted that the components and the operation of the exemplary mixer assembly 105 are shown and described in greater detail in U.S. patent application Ser. No. 16/394,889 filed Apr. 25, 2019 for METHODS AND APPARATUS FOR POST-MIX DRINK DISPENSING, which by this reference is incorporated herein as though herein now set forth in its entirety.

Figure 8:
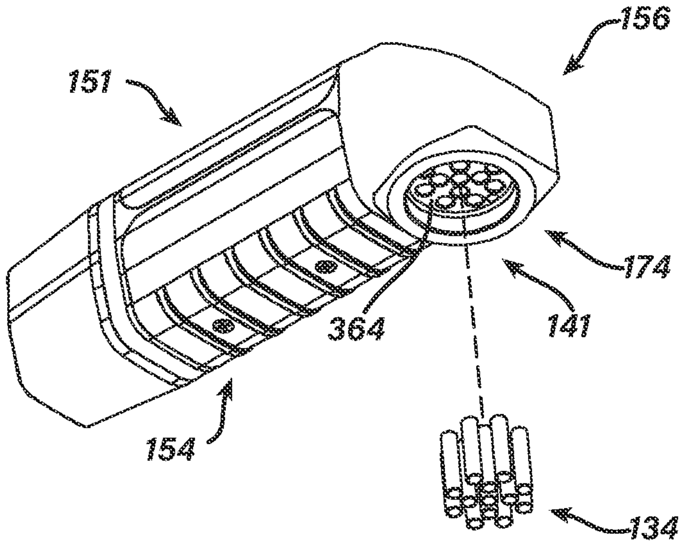
FIG. 8 is a partially exploded bottom isometric view illustrating various details of the mixer assembly removability arrangement according to the second embodiment.
Figure 9:
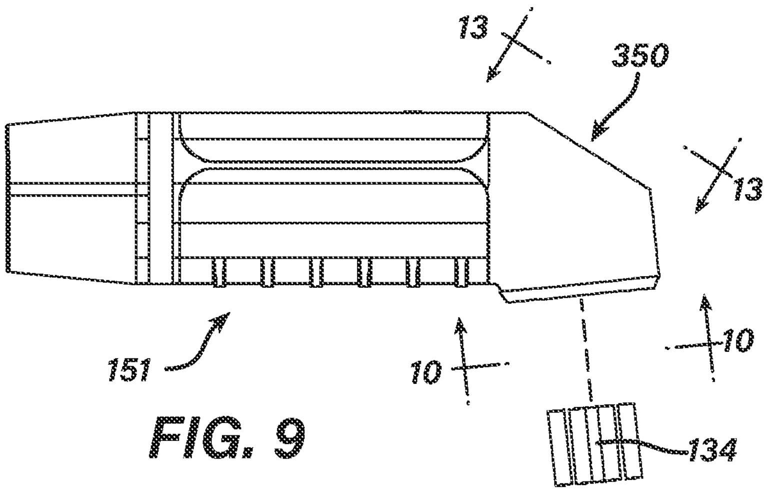
FIG. 9 is a partially exploded right side elevational view illustrating various details of the mixer assembly removability arrangement according to the second embodiment.
Figure 13:
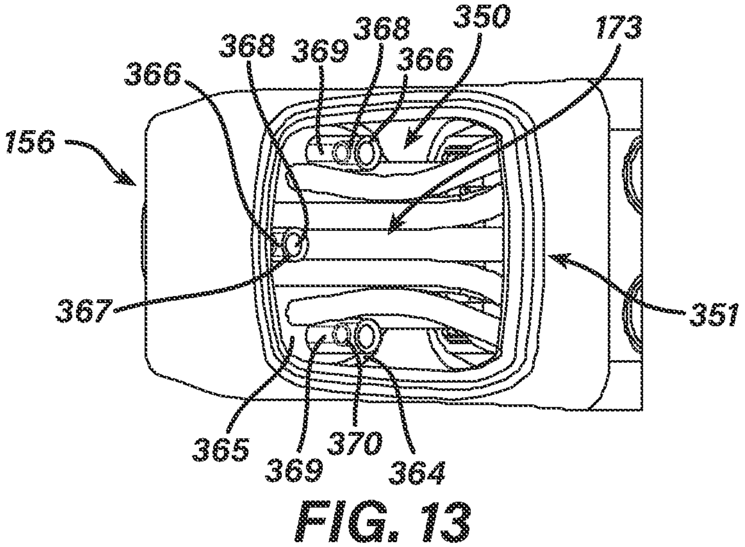
FIG. 13 is a partially cut away top front end view taken along lines 143-143 of FIG. 139 illustrating various details of the mixer assembly removability arrangement according to the second embodiment.

As shown in FIG. 6, a plurality of connector tube orifices 108, as will be detailed further herein, is provided at the top 107 of the mixer assembly 105 for introduction of beverage components to the mixer assembly 105. As will be better understood further herein, each beverage product conveyed through one of the beverage product dispensing conduits 173, as shown for example in FIG. 13, is ultimately introduced to the mixer assembly 105 through a corresponding one of the connector tube orifices 108 at the top 107 of the mixer assembly 105, wherein the introduced beverage product is channeled internally through the mixer assembly 105 as is otherwise conventional in the relevant arts. To the extent that additional provision must be made to convey fluids from the fluid outlets 174 to the connector tube orifices 108 at the top 107 of the mixer assembly 105, however, a plurality of connector tubes 134 as shown in FIGS. 7-9 are provided, as will be better understood further herein.

Figure 10:
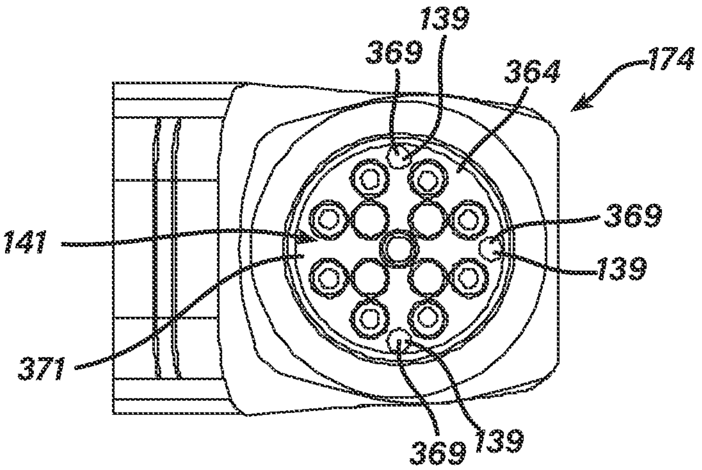
FIG. 10 is a partially cut away bottom front end view taken along lines 140-140 of FIG. 139 illustrating various details of the mixer assembly removability arrangement according to the second embodiment.
Figure 11:
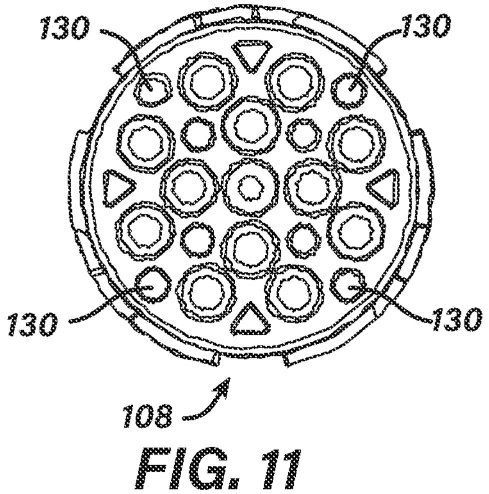
FIG. 11 is a top plan view illustrating various details of an exemplary mixer assembly suitable for use in the exemplary implementation of the mixer assembly removability arrangement according to the second embodiment.

As shown in FIG. 10, the preferred implementation of the hand-held beverage dispenser 150 comprises a toe plate 364, which, as will be better understood further herein, provides a sturdy base upon which the interface between the piping system of the exemplary hand-held beverage dispenser 150 and the mixer assembly 105 is implemented. The toe plate 364 is preferably unitarily formed with the handle body 151, and in any case at the bottom of the interior space 350 at the forward end 156 of the handle body 151. As shown in FIG. 8, the toe plate 364 is supported all around by, and forms a part of, the bottom 154 of the handle body 151.

In any case and as best shown in FIG. 13, the terminus of each beverage product dispensing conduit 173 is collected, arranged and stably fixed to the top side 365 and slightly within the toe plate 364. As will in light of this exemplary description be appreciated by those of ordinary skill in the relevant arts, the collective support provided by the rigidly provided toe plate 364 prevents any excessive strain or stress on or to the beverage product dispensing conduits 173 as the mixer assembly 105 of the post-mix type drink dispenser assembly is attached or removed to or from the handle body 151. Additionally and as best shown in FIG. 10, each of the fluid outlets 174 from the piping system is formed within the toe plate 364 at the terminus of a corresponding one of the beverage product dispensing conduits 173. As shown in FIGS. 7-8 and each of the provided fluid outlets 174 extends downward through the toe plate 364, and opens to the exterior of the handle body 151 at the bottom side 371 of the toe plate 364 through the substantially planar top of a downwardly opening cylindrical cavity 141 formed in the bottom side 371 of the toe plate 364. As will in light of this exemplary description also be appreciated by those of ordinary skill in the relevant arts, fixing the fluid outlets 174 about the depicted substantially planar top of the downwardly opening cylindrical cavity 141 of the toe plate 364 provides a consistent rigid interface for attachment of the mixer assembly 105 of the post-mix type drink dispenser assembly.

In any case, the fluid outlets 174 from the piping system 158 are arranged at the bottom side 371 of the toe plate 364 as required to interface with the mixer assembly 105 of the post-mix type drink dispenser assembly. Additionally, the previously noted arrangement at the top side 365 of the toe plate 364 of the terminus of each beverage product dispensing conduit 173 most preferably corresponds to the arrangement of the fluid outlets 174 at the bottom side 371 of the toe plate 364. In this manner, implementing the previously discussed fluid communication through the toe plate 364 between the beverage product dispensing conduits 173 at the top side 365 and the corresponding fluid outlets 174 at the bottom side 371 is facilitated.

As will be better understood herein, the previously described cylindrical cavity 141 is sized and otherwise adapted to dependently receive the upper portion of the mixer assembly 105, as operably affixed to the handle body 151 of the hand-held beverage dispenser 150. As shown in the figures and particularly in FIG. 10, each fluid outlet 174 comprises a cylindrical orifice formed or otherwise provided in the top of the downwardly opening cylindrical cavity 141 of the toe plate 364 concentrically about the terminus of a corresponding one of the product dispensing conduits 173. The fluid outlets 174, in turn, are arranged as required to interface with the mixer assembly 105, and the cylindrical orifices forming the fluid outlets 174 from the piping system 158 are also sized, shaped and otherwise adapted as required to interface with the mixer assembly 105 of the post-mix type drink dispenser assembly, as will be better understood further herein.

Providing for efficient yet reliable attachment of any post-mix type drink dispenser assembly to a hand-held beverage dispenser can be difficult under any circumstance. Providing a hand-held beverage dispenser with an efficient and reliable attachment interface conforming to an off-the-shelf post-mix type drink dispenser assembly is exceptionally challenging. In order to take advantage of manufacturer experience in achieving leak and other trouble free attachment of a post-mix type drink dispenser assembly, or a product line of post-mix type drink dispenser assemblies, with minimal, if any, modification of the post-mix type drink dispenser assembly and ever cognizant of the need to adhere to the previously detailed general constraints for implementation of a commercially suitable hand-held beverage dispenser 150, which address such matters as size, mass, comfort in hand, ease of use and maintenance, safety and reliability, Applicant has determined that securement of the post-mix type drink dispenser assembly 104 from the top 152 of the handle body 151 is most desirable.

As particularly shown in FIG. 13, however, the interior space 350 at the forward end 156 of the handle body 151, at the bottom of which the toe plate 364 is located, is like all other spaces substantially within the extents of the handle body 151 nearly fully occupied by elements of the piping system for the hand-held beverage dispenser 150. As shown in the figures, each of the beverage product dispensing conduits 173 run horizontally into the interior space 350, and then vertically downward to interface as previously described with the toe plate 364. As will be appreciated by those of ordinary skill in the relevant arts, the respective points of entry to the interior space 350 of each of the beverage product dispensing conduits 173 is largely predetermined by the needs to accommodate valves, valve controls and the like features within the limited extents of the handle body 151. Additionally, the respective points of interface with the toe plate 364 of each of the beverage product dispensing conduits 173, as well as the size and to some extent shape of the toe plate 364, are largely determined by arrangement about the top of a compatible mixer assembly 105 of beverage component inlets, as well as the size and shape of the mixer assembly 105.

As a result of the foregoing parameters, the ability to modify the implemented routing through the interior space 350 of each of the beverage product dispensing conduits 173 without expanding the extents of the handle body 151 is very limited at best. Correspondingly, the ability to combine or otherwise rearrange unused area at the top side 365 of the toe plate 364 is likewise very limited at best. As particularly shown in FIG. 11, the top 107 of the mixer assembly 105 of the implemented post-mix type drink dispenser assembly comprises a plurality of tapped holes 130 for dependently affixing the mixer assembly 105 to a beverage dispenser, each of which is longitudinally oriented parallel to the longitudinal axis 140 through the mixer assembly 105. Utilizing these manufacturer provided features, in accordance with the most preferred implementation of the mixer assembly removability arrangement of the present invention, machine screws of the correct thread size must be inserted, in alignment with the longitudinal axis of each tapped hole 130, from within the interior space 350, through the toe plate 364 and into each of the tapped holes 130 to a specified insertion depth, notwithstanding the above described limited unused area at the top side 365 of the toe plate 364, and the general difficulty of physically reaching any unused area at the top side 365 of the toe plate 364 as barricaded by the previously described routing of the beverage product dispensing conduits 173.

In addition to the foregoing obstacles to securing the mixer assembly 105 from the top 152 of the handle body 151, it is noted that securement from the top 152 not only requires an opening 351 to the interior space 350, but also provision of the previously mentioned cover 352 for the opening 351. Additionally, the cover 352 must be readily removable, yet secure in use, thereby presenting the further obstacle that attachment hardware must be provided as well as appropriate structures within the interior space 350 for engagement of the hardware. Furthermore, the cover 352 must be accommodated at the depicted steep slope in order to avoid adding to the extents of the handle body 151. Locating the cover 352, for example at the forward end 156 or along a side 155 of the handle body 151 are also impracticable, as such access would fail to provide access for a screwdriver or like tool, along the longitudinal axis of each previously described tapped hole 130 for the mixer assembly 105. Notwithstanding each of these obstacles to securement of the post-mix type drink dispenser assembly 104 from the top 152 of the handle body 151, Applicant has implemented a novel and inventive mixer assembly removability arrangement enabling the desired functionality.

As best shown in FIGS. 6-7 and 12-13, a preferred implementation of the mixer assembly removability arrangement of the present invention generally comprises a specially formed cover 352 for an opening 351 to the previously described interior space 350 of the handle body 151 of the hand-held beverage dispenser 150. A plurality of specially formed upwardly projecting mounting bosses 366 are disposed, within the interior space 350, about the top side 365 of the toe plate 364, which in substantial part forms the bottom of the interior space 350, as particularly shown in FIG. 13. As particularly shown in FIG. 10, a plurality of clearance holes 369 is formed through the toe plate 364, and aligned and arranged about the toe plate 364 complementary to the arrangement of the previously described tapped holes 130 about the top 107 of the mixer assembly 105 of the implemented post-mix type drink dispenser assembly. Each of the upwardly projecting mounting bosses 366 disposed about the top side 365 of the toe plate 364 is positioned about the top side 365 of the toe plate 364 in longitudinal alignment with one of the clearance holes 369 through the toe plate 364.

As shown in FIG. 13, a counterbore 368 is formed or otherwise provided in the top end 367 of each of the preferably cylindrical upwardly projecting mounting bosses 366. As also shown in the figure, a corresponding one of the previously described clearance holes 369 through the toe plate 364 extends through each upwardly projecting mounting boss 366 to form a shoulder 370 at the bottom of the counterbore 368. As shown FIGS. 10 and 13, the shoulder 370 defines the first end of a clearance hole 369, which runs through the bottom of the upwardly projecting mounting boss 366 at the top side 365 of the toe plate 364, and continues through the toe plate 364 where the bottom end 139 of the clearance hole 369 emerges at the bottom side 371 of the toe plate 364.

Figure 12:
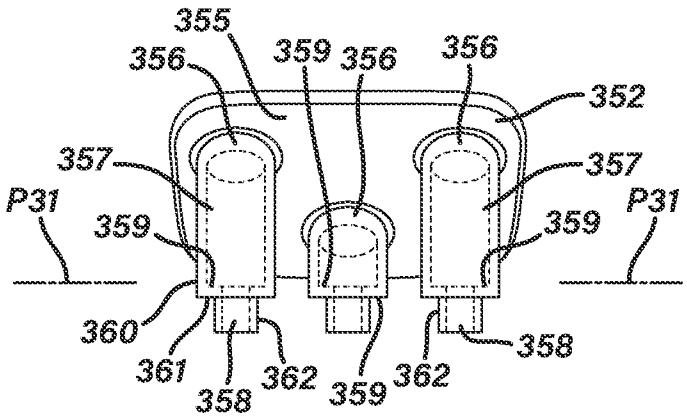
FIG. 12 is a rear end elevational view illustrating a cover of the mixer assembly removability arrangement according to the second embodiment.

As shown in FIGS. 6-7 and 12, each previously mentioned specially formed cover 352 comprises a top, exterior face 353 and a bottom, interior face 355. As particularly shown in FIG. 6, a plurality of cylindrical hardware recesses 354 is formed through the top, exterior face 353 of the cover 352. Importantly, each of the cylindrical hardware recesses 354 is longitudinally oriented parallel to the longitudinal axis 140 through the mixer assembly 105. As shown in FIGS. 7 and 12, a downwardly projecting mounting boss 356 is formed or otherwise provided from the bottom, interior face 355 of the cover, each downwardly projecting mounting boss 356 being longitudinally aligned with a corresponding one of the hardware recesses 354. As shown in FIG. 12, each of the hardware recesses 354 comprises a counterbore 357 having an interior diameter slightly larger than the head diameter of each of the machine screws 363 specified for the mixer assembly removability arrangement, as will be better understood further herein. A centrally aligned clearance hole 358 originates at the bottom of the counterbore 357, thereby forming an interior shoulder 359 at the bottom of the counterbore 357, and runs through the lower extent of the downwardly projecting mounting boss 356. An exterior shoulder 361 is formed or otherwise provided at the bottom end 360 of the downwardly projecting mounting boss 356, thereby forming a tubular insert 362.

Finally, the clearance hole 358 running through each downwardly projecting mounting boss 356 should be of equal diameter to that of the clearance hole 369 running through each upwardly projecting mounting boss 366, and which diameter should be slightly larger than the diameter of the major threads of the machine screws 363 specified for the mixer assembly removability arrangement. Additionally, the outer diameter of each tubular insert 362 at the bottom end 360 of each downwardly projecting mounting boss 356 should be slightly less than the diameter of the counterbore 357 into each upwardly projecting mounting boss 366, and the length of the tubular insert 362 at the bottom end 360 of each downwardly projecting mounting boss 356 should be slightly less than the depth of the counterbore 357 into each upwardly projecting mounting boss 366. Finally, the outer diameter of each downwardly projecting mounting boss 356 should be coextensive with the outer diameter of each upwardly projecting mounting boss 366.

In use of the mixer assembly removability arrangement for firmly securing in place a mixer assembly 105, as partially inserted into the cavity 141 and pressed snugly against the rubber seal 133, the specially formed cover 352 is set in place over and about the opening 351 to the interior space 350. As the cover 352 is set in place, it is noted that the tubular insert 362 at the bottom end 360 of each downwardly projecting mounting boss 356 will be received within the counterbore 357 into each corresponding upwardly projecting mounting boss 366.

At this juncture, it is noted that the lengths of each downwardly projecting mounting boss 356 and each corresponding upwardly projecting mounting boss 366 are most preferably implemented such that each tubular insert 362 is fully engaged within the corresponding counterbore 357, and, of greater importance, each interior shoulder 359 formed in the downwardly projecting mounting bosses 356 lies in a single plane P31 transverse to the longitudinal axis 140 through the mixer assembly 105, as attached to the handle body 151. As will in light of this exemplary description be understood by those of ordinary skill in the relevant arts, the described arrangement enables specification of a single length for each machine screw 363 for use in the mixer assembly removability arrangement.

In any case, the machine screws 363 are then inserted through the hardware recesses 354 at the top, exterior face 353 of the cover 352. Each set of end-to-end combined clearance holes 358, 369 provides a channel completely through the handle body 151, the bottom of which is aligned adjacent with and directly over a corresponding one of the tapped holes 130 about the top 107 of the first stage body 106 of the mixer assembly 105. With the mixer assembly 105 manually supported as necessary, the machine screws 363 are tightened as specified for the mixer assembly removability arrangement, compressing the rubber seal 133 operatively between the top 107 of the mixer assembly 105 and the bottom side 371 of the toe plate 364.

As will be appreciated by those of ordinary skill in the relevant arts, the inventive mixer assembly removability arrangement provides for simple removal or attachment of a post-mix type drink dispenser assembly from or to a hand-held beverage dispenser. Additionally, the inventive mixer assembly removability arrangement enables the use of commercially available off-the-shelf and similar integrations in implementing a post-mix type drink dispenser assembly 104 for the hand-held beverage dispenser 150. Still further, the inventive mixer assembly removability arrangement meets each object of the invention without any need for attachment collars or other interfaces, which would add very undesirable weight and bulkiness to the hand-held beverage dispenser 150. The inventive mixer assembly removability arrangement also avoids the introduction of mounting hardware and the like to any part of the hand-held beverage dispenser 150 that in use is placed over and about a beverage vessel receiving a post-mix beverage, thereby eliminating the possibility of such hardware loosening and falling into a beverage vessel.

Where a full length upper enclosure for a hand-held beverage dispenser is not possible or otherwise undesired, thereby precluding implementation of the first embodiment, and the interior space at the top, forward end of the handle body of a the hand-held beverage dispenser cannot provide sufficient space or clearance to implement the teachings of the second embodiment or provision of an access opening to the interior space is either not possible or otherwise undesired, a third embodiment of a mixer assembly removability arrangement contemplates provision of a mounting body for attachment of the mixer assembly 105 at the bottom of a hand-held beverage dispenser 10.

Figure 14:
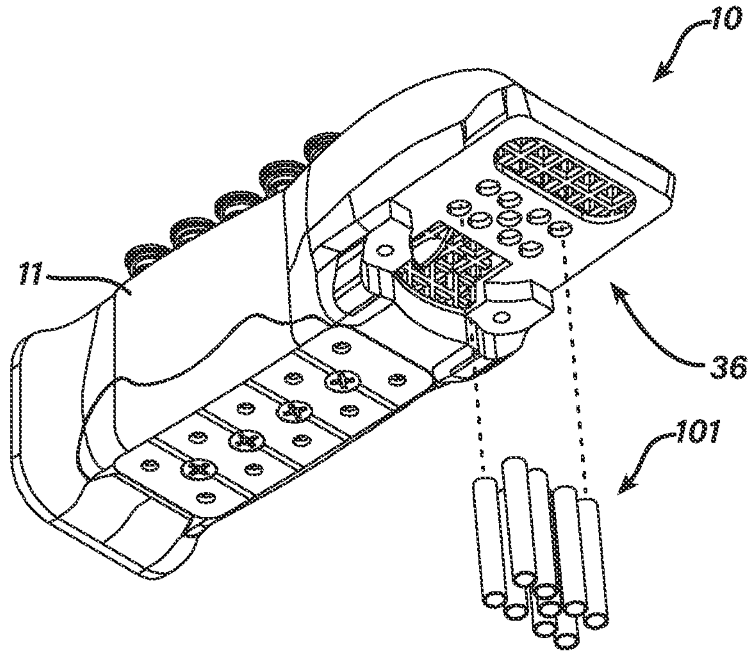
FIG. 14 is a partially exploded bottom isometric view illustrating a mixer assembly removability arrangement according to the third embodiment.
Figure 15:
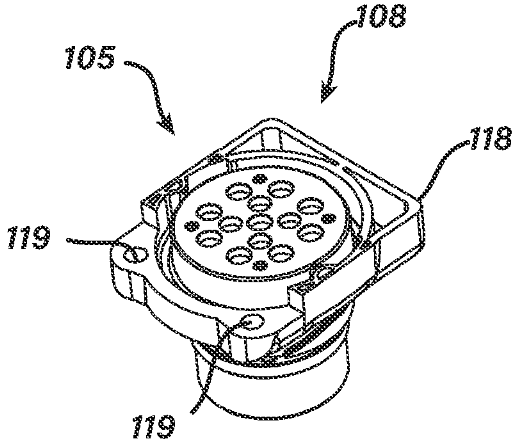
FIG. 15 is a top isometric view illustrating the mixer assembly removability arrangement according to the first embodiment.
Figure 16:
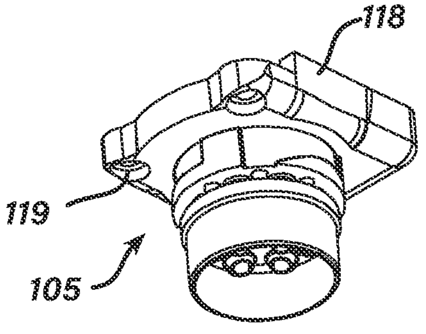
FIG. 16 is a bottom isometric view illustrating the mixer assembly removability arrangement according to the first embodiment.

In accordance with the third embodiment, a mixer assembly removability arrangement for a hand-held beverage dispenser 10 comprises a preferably aesthetic mounting body 118 formed unitary or integral with a mixer assembly 105, and including a provision for ready removal or attachment of the mounting body 118 from or to a hand-held beverage dispenser. As shown in FIGS. 14-16, the mounting body 118 and at least a portion of the bottom adjacent the front end of the handle body and the aesthetic mounting body 118 are sized, shaped and otherwise cooperatively adapted for mating engagement one with the other. To this end, as shown in FIGS. 14-16, mounting through holes 119 are provided through the aesthetic mounting body 118 corresponding to mating threaded holes 19 provided on the handle body 11. As particularly shown in FIG. 17, conventional mounting hardware 120 such as, for example, screws 121 pass through the mounting holes 119 disposed about the mounting body 118, and securely engage the corresponding threaded holes 19 on the handle body 11. As will be readily appreciated by those of ordinary skill in the art, the readily affixed mounting body 118, including the provided mixer assembly 105, is likewise readily removable from the handle body 11.

Figure 17:
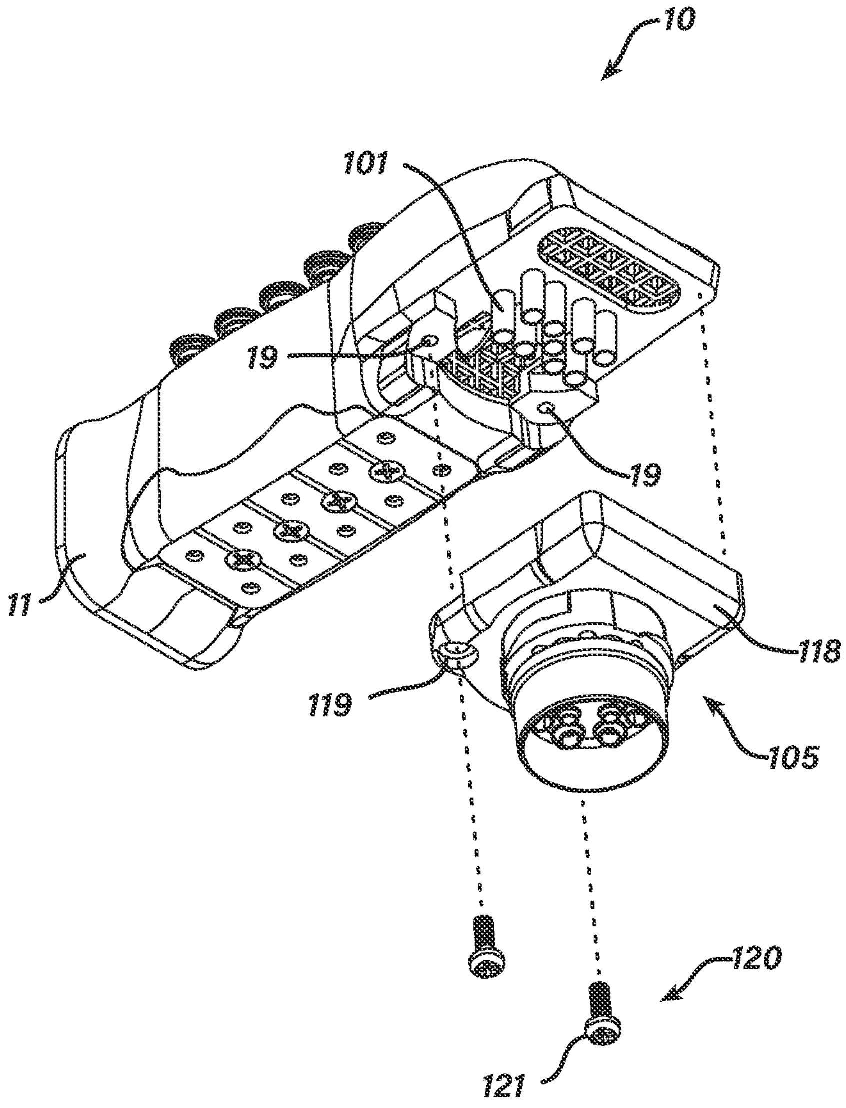
FIG. 17 is a partially exploded bottom isometric view illustrating the mixer assembly removability arrangement according to the first embodiment.

In order to facilitate attachment of the mixer assembly 105 in fluid communication with the plurality fluid outlets 36 of the handle body 11, as particularly shown in FIGS. 14 and 17, Applicant has found it desirable to provide an equal plurality of connector tubes 101 as are provided fluid outlets 36. In accordance with the exemplary preferred implementation of the mixer assembly removability arrangement for the hand-held beverage dispenser 10, a connector tube 101 is securely received in each of the fluid outlets 36 from the handle body 11, such as by press fitting or the like. While the provided connector tubes 101 are preferably securely attached to the fluid outlets 36, they are most preferably readily removably, but sealingly, received within corresponding connector tube orifices 108 provided in the implemented mixer assembly 105.

As previously noted, provision of the mixer assembly removability arrangement of the third embodiment turns squarely away from the longstanding practice in the prior art of providing a mixer assembly that is either unitary with the handle body or so highly integral therewith as to make removal or disassembly for maintenance impractical if not wholly impossible. In at least the most preferred implementations of the third embodiment of the mixer assembly removability arrangement, however, any readily separable components of the mixer assembly 105, such as, for example, multiple stage bodies, are press fit together or otherwise made integral. In this manner, service industry workers, as will typically care for the hand-held beverage dispenser 10, will not be burdened with multiple parts that are easily lost or troublesome to assemble, while nonetheless making available the benefits of a removable mixer assembly 105. As previously noted the details of an exemplary post-mix type drink dispenser assembly, including a mixer assembly which operates in a manner consistent with the present invention, are shown and described in U.S. patent application Ser. No. 16/394,889 filed Apr. 25, 2019 for METHODS AND APPARATUS FOR POST-MIX DRINK DISPENSING, which by this reference is incorporated herein as though now set forth in its entirety.

What is claimed is:

1. An arrangement for selective removal of a post-mix type mixer assembly from a hand-held beverage dispenser, said arrangement comprising:

a handle body housing a piping system configured to dispense post-mix beverage products through a mixer assembly;

a toe plate formed within said handle body, said toe plate being configured to dependently support said mixer assembly;

a plurality of mounting bosses, each said mounting boss projecting upwardly from said toe plate and having a central orifice;

wherein:

each central orifice through a mounting boss extends from a bottom end of said mounting boss through said toe plate; and each central orifice is axially aligned with a mounting hole formed in said mixer assembly as operably supported by said toe plate;

said handle body including a plurality of access ports, each said access port being axially aligned with one of each said central orifice through a mounting boss; and each said access port allowing passage for a releasable fastener provided top to bottom through each said central orifice, each said releasable fastener being adapted to releasably engage a said mounting hole formed in said mixer assembly.

2. The arrangement for selective removal of a post-mix type mixer assembly from a hand-held beverage dispenser of claim 1, comprising an upper enclosure member securable with the handle body thereby covering said plurality of access ports.

3. An arrangement for selective removal of a post-mix type mixer assembly from a hand-held beverage dispenser, said arrangement comprising:

a handle body housing a piping system configured to dispense post-mix beverage products through a mixer assembly;

a toe plate formed within said handle body, said toe plate being configured to dependently support said mixer assembly;

a plurality of mounting bosses, each said mounting boss projecting upwardly from said toe plate and having a central orifice;

wherein:

each central orifice through a mounting boss extends from a bottom end of said mounting boss through said toe plate; and each central orifice is axially aligned with a mounting hole formed in said mixer assembly as operably supported by said toe plate;

said handle body including an opening into an interior space having said plurality of upwardly projecting mounting bosses therein;

a cover including a plurality of mounting bosses, each said mounting boss projecting downwardly from said cover and having a central orifice, said cover being configured to set in place over and about said opening to said interior space wherein each central orifice through a downwardly projecting mounting boss axially aligns with one of each said central orifice through an upwardly projecting mounting boss; and wherein a releasable fastener is provided top to bottom through each said central orifice of a downwardly projecting mounting boss and each said central orifice through an upwardly projecting mounting boss, each said releasable fastener being adapted to releasably engage a said mounting hole formed in a mixer assembly.

* * * * *